Inventor
David McKelvey
By Lacey & Lacey
Attys.

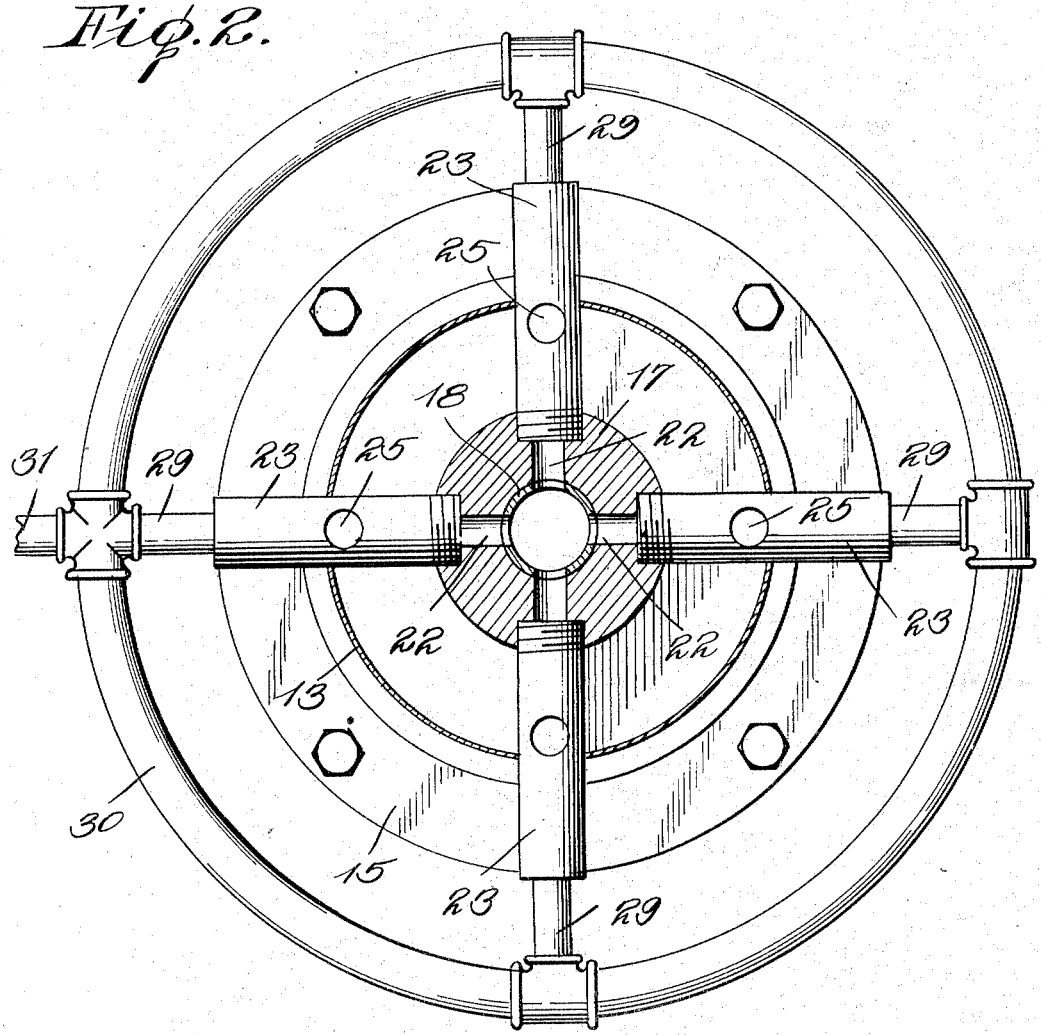
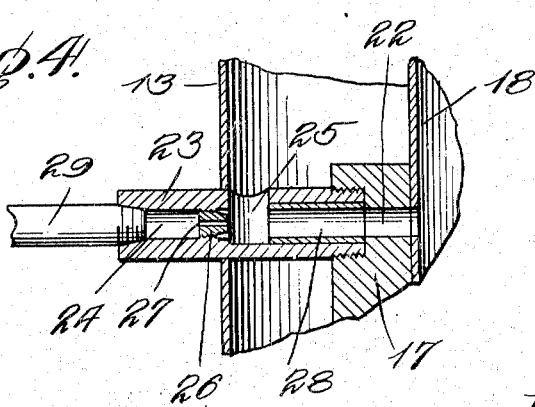

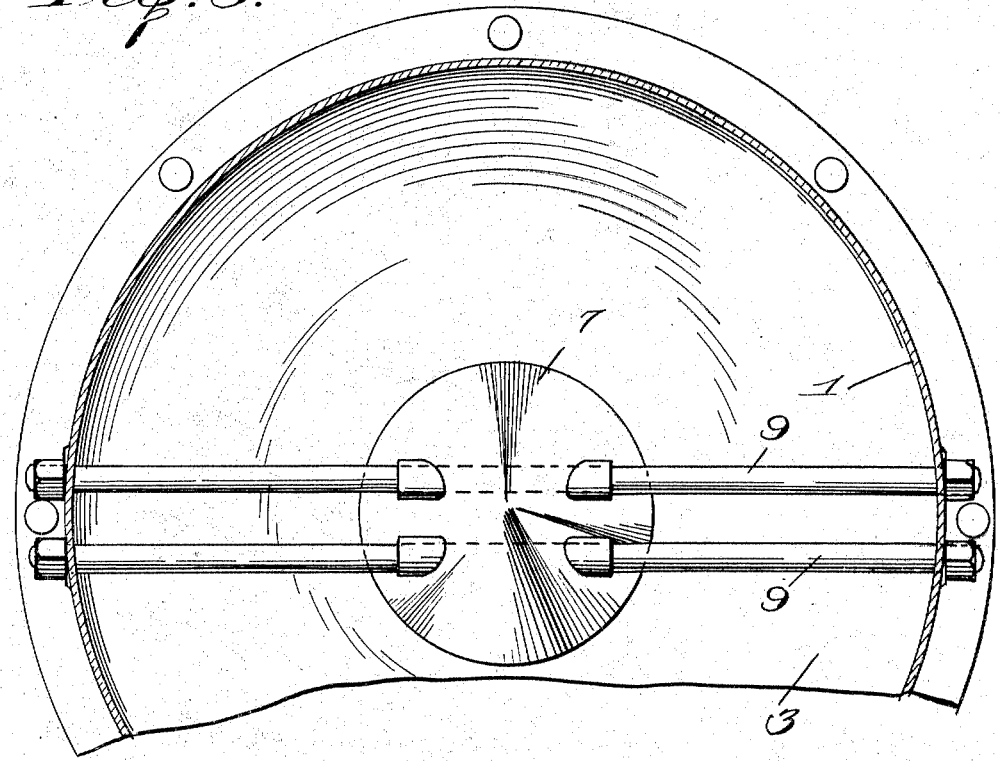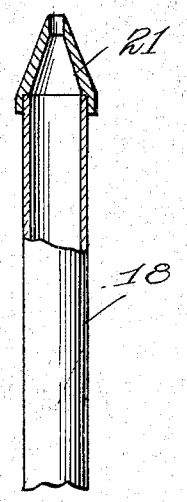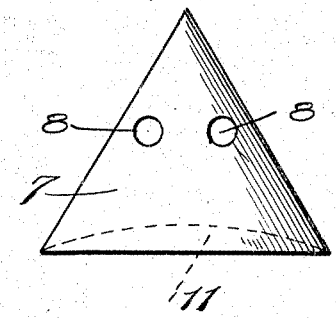

UNITED STATES PATENT OFFICE.

DAVID McKELVEY, OF CHICAGO, ILLINOIS.

PULVERIZER.

1,325,676.  Specification of Letters Patent.  Patented Dec. 23, 1919.

Application filed April 1, 1919. Serial No. 286,658.

*To all whom it may concern:*

Be it known that I, DAVID MCKELVEY, a citizen of the United States, residing at Chicago, in the county of Cook and State of Illinois, have invented certain new and useful Improvements in Pulverizers, of which the following is a specification.

This invention is a pneumatic pulverizer intended for use in reducing to minute particles the grains of previously ground material. The object of the invention is to provide means whereby the particles of the previously ground material will be caused to impact forcibly against each other and against an unyielding surface so that they will be subdivided minutely and will be eventually carried from the apparatus by the air blast from which the pulverizing impact is received. The invention seeks to provide an apparatus for the stated purpose of improved construction whereby the cost of maintenance will be reduced and the life of the apparatus will be prolonged. The accompanying drawings illustrate one form of apparatus embodying my improvements and in said drawings—

Fig. 2 is a horizontal section taken just above the air blast members;

Fig. 3 is a horizontal section taken just above the spreading and pulverizing impact cone;

Fig. 4 is an enlarged section through one of the air blast nozzles;

Fig. 5 is a detail view of the inner pipe or nozzle from which the material is ejected against the cone;

Fig. 6 is a detail elevation of the cone.

Figure 1:
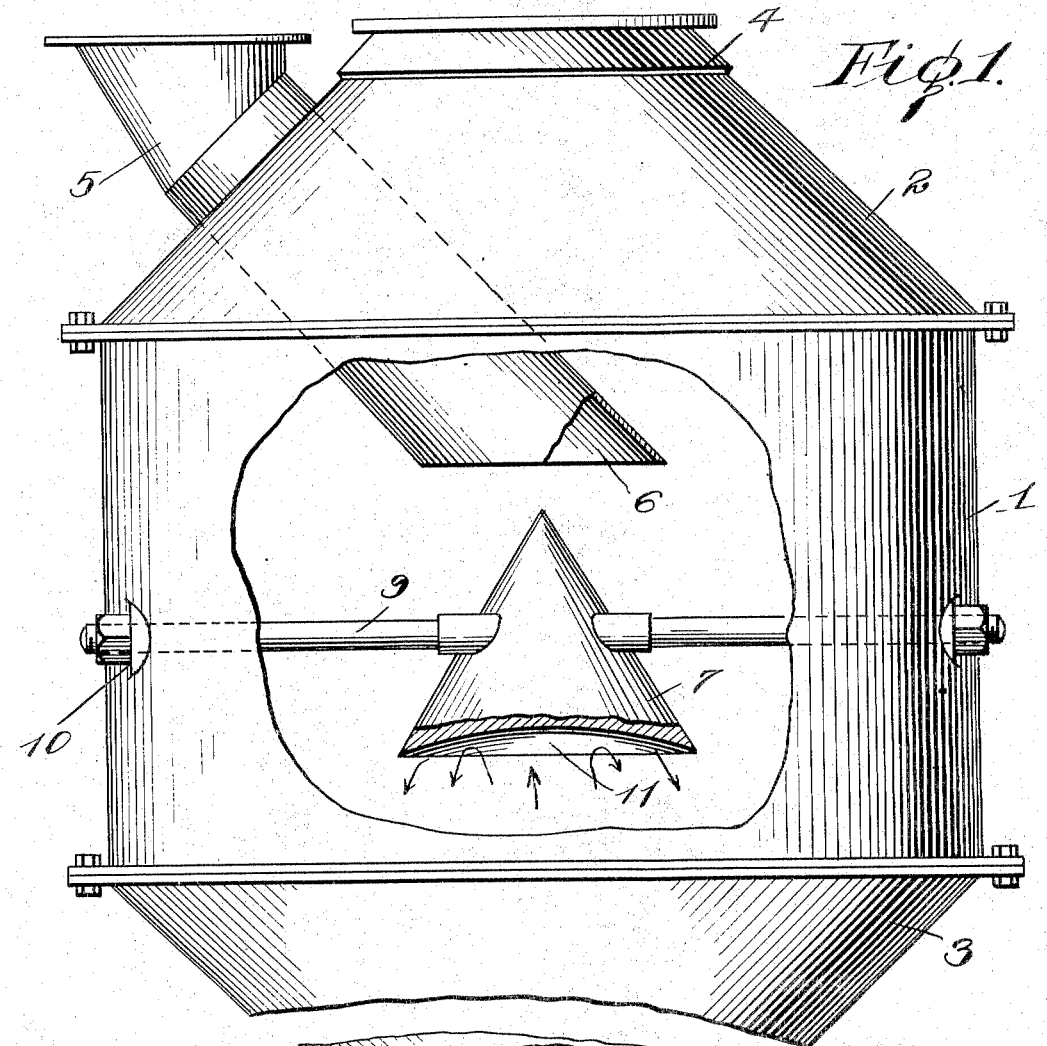
Figure 1 is an elevation with parts broken away and parts in section of a pulverizer constructed and operating in accordance with my invention.
Figure 1:
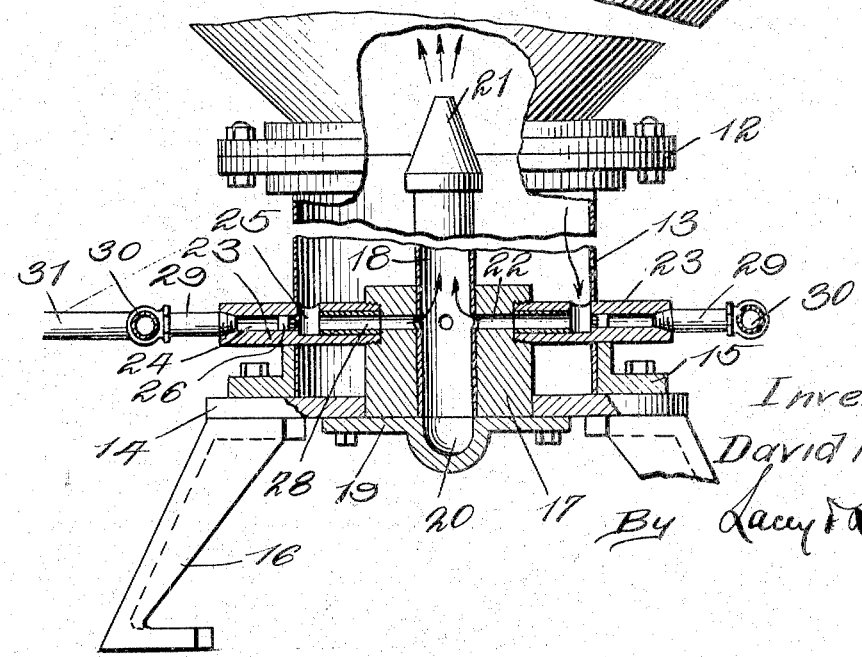

In carrying out my invention, I employ a casing 1 which is preferably cylindrical and provided with tapered heads 2 and 3. A collar 4 is fitted upon the upper end of the upper head 2 and may have the end of a distributing outlet pipe secured thereto while a feed chute or hopper 5 is secured in and extends through said head with its lower end 6 directly over the impact pulverizing cone and spreader 7. The spreader and pulverizing cone 7 is constructed of manganese steel and has spaced passages 8 formed therethrough to receive the supporting rods 9 which are securely fastened in the wall of the casing 1, as shown at 10, and passed through the cone so that it will be positively supported against all turning movement. The lower end or base of the cone is dished or concave, as shown at 11, and the cone is disposed at the vertical axis or center of the casing as will be readily understood. The lower tapered head 3 is secured to base rings 12 which also receive and secure the upper end of an outer pipe or cylindrical casing 13, the lower end of which rests upon a base plate 14 and is held centrally thereon by an annulus 15 bolted on the upper side of the same. The base ring 14 is further secured to and rests on legs 16 by which the entire apparatus is supported. The base 14 is provided with a central opening which receives a block 17 having a pipe or tube 18 fitted centrally therein and to the under side of the base 14 is secured a cap plate 19 having a central chamber or socket 20 arranged to register with the inner tube or pipe 18 so as to catch any particles which may drop to the bottom of said tube or pipe and prevent loss of the same. By merely removing the cap plate 19, the interior of the tube or pipe 18 is accessible and may be readily cleaned if necessary. The tube or pipe 18 is concentric with the outer cylindrical casing or housing 13 and is also concentric with the cone 7 and on the upper end of the tube or pipe 18 is fitted a conical nozzle 21 so that the material issuing therefrom will be directed in a fine stream forcibly and directly against the under side or base of the cone 7 so as to be broken up by the force of the impact. The block 17 is provided with a plurality of radial passages 22, the outer ends of which are enlarged to provide sockets receiving the inner ends of the blast pipes 23. These blast pipes are provided with longitudinal bores 24 and with a transverse or radial opening 25 communicating with the said bore and through which the material being treated will be drawn by the force of suction. A stop plug 26 is fitted in the bore 24 at the outer side of the radial inlet opening 25 and is provided with a central contracted passage 27 so that the air blast admitted to the blast tube will be increased in pressure and will escape said plug with an increased force so that the material above the blast tube will be forcibly sucked into the same and ejected through the inner end thereof and the passage 22 in the block 17. A bushing or sleeve 28 is fitted in the inner portion of the bore 24 so as to receive the wear due to the flow of the material and thereby reduce the cost of maintenance and prolong the life of the apparatus inasmuch as these sleeves or bushings may be of cheap material and may be renewed at less cost than the cost of a blast tube. In the outer end of each blast tube 23 is secured the inner end of a nozzle 29 which has its outer end coupled to and in communication with a circular air blast pipe 30 which receives air under pressure through a feed pipe 31 from any convenient or preferred form of air compressor or pump.

It is thought the operation of my improved apparatus will be readily understood. The material to be treated is first ground so that it will pass through an 8-mesh screen and is then fed manually or mechanically or otherwise through the feed chute 5. The material will flow from the lower end of the feed chute directly onto the cone 7 and will be spread thereby equally in all directions within the housing or casing 1 so that it will pass by gravity into the space between the outer tube 13 and the inner tube or pipe 18. A constant flow of compressed air is maintained through the pipe 30 and the several nozzles 29 and this air will flow very rapidly through the blast tubes 23 and the passages 22 of the block 17 into the inner tube. As the compressed air flows across the opening 25 it will create a suction which will draw the material into said opening whence it will be carried through the sleeve or bushing 28 and the passage 22 into the inner tube or pipe 18 and thence upward through the nozzle 21 against the concave bottom 11 of the spreader 7. The material will be drawn into the tube 18 simultaneously through all the blast tubes, four being shown in the present instance, so that the particles will be caused to forcibly strike against each other within the said inner tube or pipe 18 and will be thereby further reduced in size. As the air blast rises through the tube 18, the particles carried thereby will be constantly agitated and caused to move against each other so that they will be further reduced and they will emerge from the nozzle 21 and be thrown against the bottom of the cone 7 with such force that they will be reduced to a fine powder. The heavier particles will again drop toward the bottom of the apparatus and will be again caught by the air blast and drawn through the blast tubes into the inner pulverizing tube or pipe 18, while the finer particles will be carried out through the outlet collar 4 with the escaping air.

My improved apparatus is exceedingly simple in its construction and the arrangement of its parts. It may be readily set up and, as there are no moving parts employed, it will require no repairs for a long period under ordinary conditions. The removal of the cap plate 19 will permit the lower end of the tube 18 to be readily cleaned and removal of all material which has not been carried off and the several blast tubes may be easily separated from the nozzles and blast pipes so that the block 17 carrying the tube 18 may be withdrawn through the base 14 and any material which may have collected around the said block withdrawn through the central opening of the said base and consequently saved.

By providing a plurality of exhaust pipes or nozzles 21 of various areas and varying the air pressure, the pulverization may be regulated so as to obtain any desired degree of fineness in the product. Those particles of the material emerging from the hopper which may have been already reduced to the desired minuteness will pass out with the escaping air without going through the nozzles.

Having thus described the invention, what is claimed as new is:

1. An apparatus for the purpose set forth comprising a housing, an impact member supported within the housing, means for delivering material into the housing, a centrally disposed tube arranged below the impact member, blast tubes communicating with said centrally disposed tube and provided with inlet openings in their upper sides, and means for delivering an air blast into said tubes and across said inlet openings.

2. In an apparatus for the purpose set forth, the combination of a housing, an impact member supported within the housing, a vertically disposed pipe arranged in the lower portion of the housing and provided with a nozzle on its upper end arranged to direct material against said impact member, a block supporting said pipe and having radial passages communicating with the interior of the pipe, blast tubes supported by said block and the wall of the housing and having their bores communicating with the passages through the block, said blast tubes being provided with inlet openings in their tops at the inner side of the wall of the housing, nozzles fitted in the outer ends of said blast tubes, and means for supplying an air blast to said nozzles.

3. In an apparatus for the purpose set forth, the combination of a housing comprising a cylindrical wall, a base ring provided with a central opening and on which the lower end of said cylindrical wall rests concentric with said opening, a supporting ring fitting around said cylindrical wall and secured on said base ring, a block fitting in the central opening of the base ring and provided with radial passages and a central bore with which said radial passages communicate, a cap plate secured to the under side of the base ring and supporting said block and provided with a central chamber communicating with the central vertical bore of the block, an impact member supported within the housing above the said block, an air tube rising centrally from said block to direct material against said impact member, blast tubes supported by said block and said cylindrical wall and constructed to receive material fed between the central pipe and the said wall, and means for supplying an air blast to said tubes.

4. In an apparatus for the purpose set forth the combination of a housing, supporting rods extending across said housing and secured rigidly in the wall of the same, and a conical spreader having parallel passages therethrough to receive said rods whereby the spreader will be supported rigidly in the housing and prevented from having any turning movement.

In testimony whereof I affix my signature.

DAVID McKELVEY. [L. S.]